UNITED STATES PATENT OFFICE.

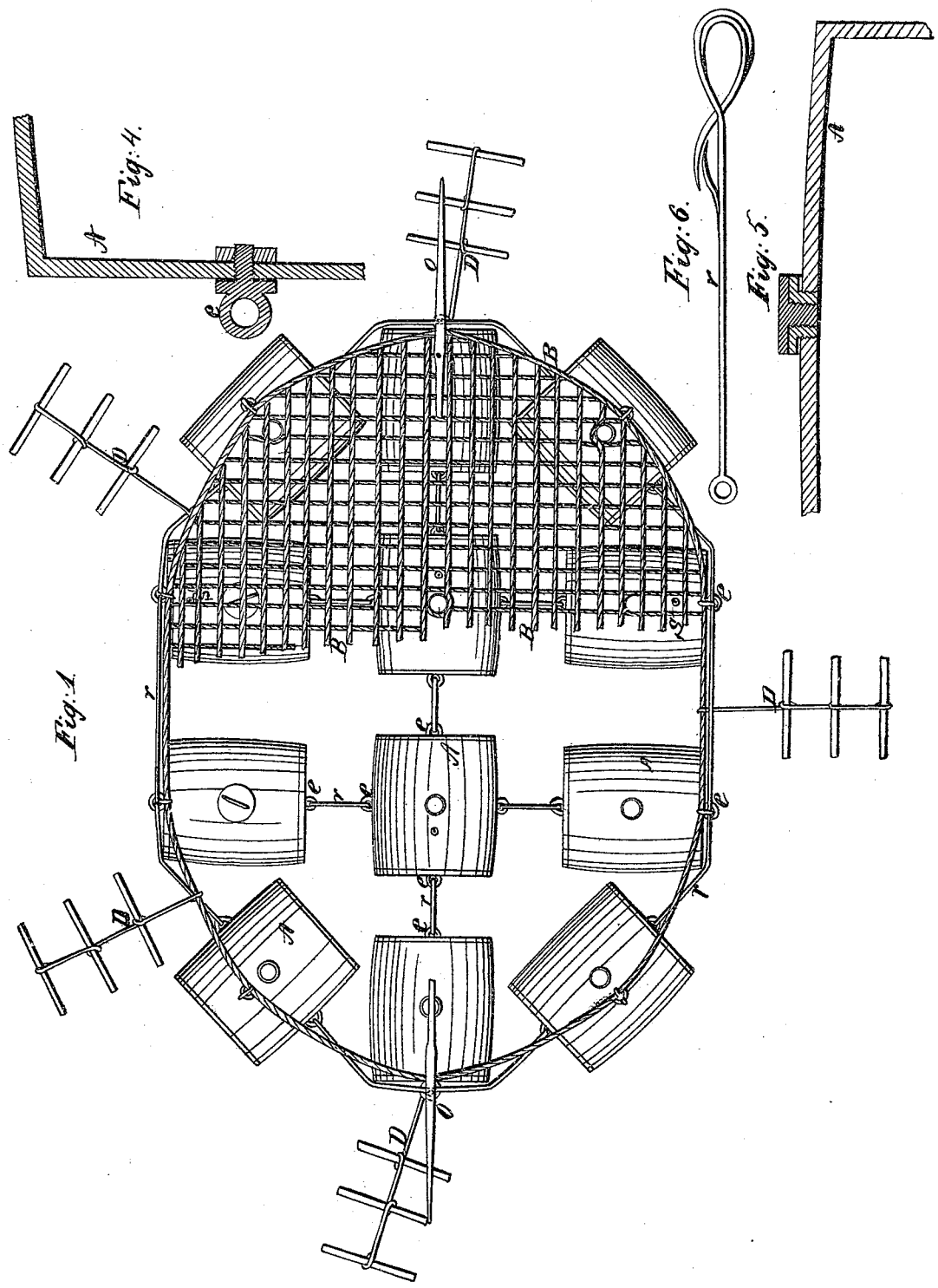
L. Taggart.
Life Preserving Raft.
Nº 19,210.   Patented Jan. 20, 1858.

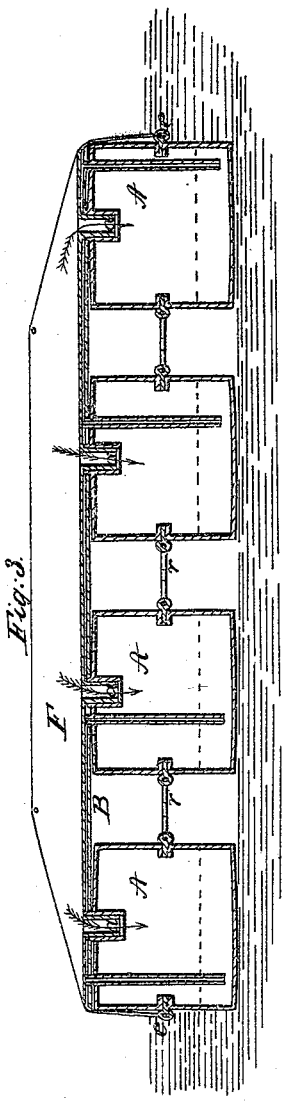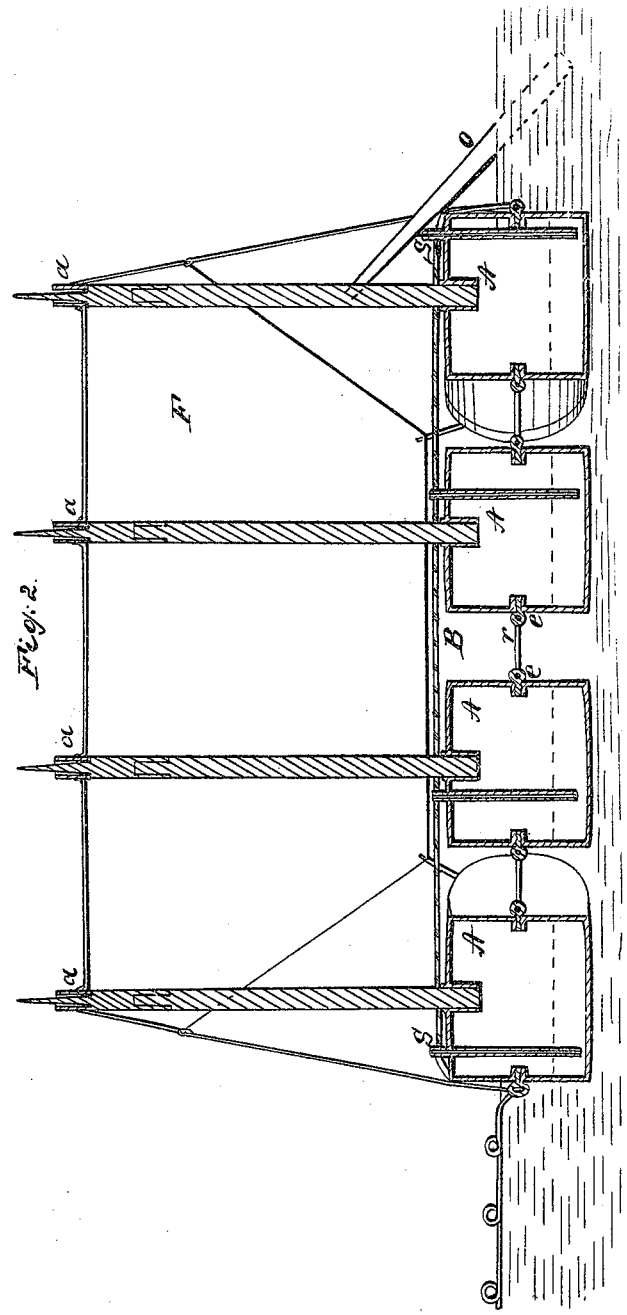
L. Taggart.
Life Preserving Raft.
No. 19,216.   Patented Jan. 26, 1858.

LORENZO TAGGART, OF PHILADELPHIA, PENNSYLVANIA.

CANVAS SHEET CONNECTED WITH LIFE-PRESERVING RAFTS.

Specification forming part of Letters Patent No. 19,216, dated January 26, 1858; Reissued March 2, 1858, No. 535.

*To all whom it may concern:*

Be it known that I, LORENZO TAGGART, of the city and county of Philadelphia and State of Pennsylvania, have invented a new and useful Improvement in Canvas Sheets Connected with Life-Preserving Rafts; and I do hereby declare that the following is a full, clear, and exact description of the construction and operation of the same, reference being had to the annexed drawing, forming part of this specification, in which—

Figure 1 is a top view of the life preserving raft. Fig. 2 is a vertical section through center with awning spread. Fig. 3 is a similar view showing awning used as a water receiver. Fig. 4 is a view showing attachment of eye *e*. Fig. 5 is a view showing manner of closing cask openings. Fig. 6 shows connecting bar.

Similar characters of reference in the several figures denote the same part.

The raft is designed to be constructed of wooden water casks fastened together in a way hereinafter to be set forth, and used in connection with a rope net work, painted canvas covering and other appliances all of which will be duly specified.

The floats A are designed to be the ordinary water casks of ships, though nothing herein stated will prevent the use of floats either metallic or wooden, made especially for the purpose. The eyes *e* with which the connecting rods *r* are connected, have a flange resting upon packing between it and the cask while its shank is secured by a strong screw passing into the cask, and by a nut inside, as shown in Fig. 4. The rods *r* connecting the casks have an eye at one end and a catch at the other as shown in Fig. 6, the eye being fastened in an eye *e* of a cask and the spring catch capable of instant connection, the securing of the casks together, will be the work of but few minutes. These rods by their rigidity prevent the casks from being dashed against each other, while at the same time they give a free connection to the floats and enable them to give to the motion of the waves. There may be as many of these floats used as is desired, depending on the number of persons to be supported. The raft thus formed is to be covered by a rope net work B to prevent the passengers from being washed off between the floats.

The casks are designed to be receptacles for food, water, and other articles necessary for shipwrecked persons. The water casks containing about one fourth of their capacity of water. Other casks are provided with articles of food, medicine, signal rockets, compass, lamp, matches, blankets, and any other necessary that prudence may suggest.

The openings of the casks are made with a flanged cylinder screwed into the cask until its flange will rest upon packing between it and the cask. The opening of this cylinder will be large enough to admit the hand and arm, and will have a screw thread on the inside so that a screw plug will close the opening as shown in Fig. 5. The water casks have each a small tube *t* running nearly to the bottom, closed at top with a screw plug. This permits the sucking of water from the cask without the danger of salt water being admitted to the interior.

F is a large sheet of painted canvas the dimensions of the raft. Along its middle line are inserted a series of short tubes *a*, equal in number to the number of the central line of casks, and separated by the space between the openings of the aforesaid casks. These tubes receive the pointed extremities of the poles *p*, so that when the lower ends of these poles are inserted in the top openings of the casks, the central line of the canvas will be lifted in a ridge. Then by drawing the edges of the canvas outward, an awning is formed for the protection of the passengers. This awning may be employed as a sail by elevating one portion and drawing the edges outward as the circumstances of the case will suggest.

The most important use of this canvas is the following: The tubes *a* are made to fit in the top openings of the casks, so that by inverting the canvas, placing the tubes in the aforesaid openings, and drawing out the edges of the canvas, a receiver is formed with outlets into the casks, for securing a supply of rain water.

There are small sockets *s* on the front and rear casks and also on some of the side ones, to receive the pin of the oar *o*, for steering or rowing.

D D are cords with pieces of wood tied to them and towed over the sides of the raft to sustain persons who may be washed off, or who are attempting to gain the raft.

One or more of the casks may be used as a receptacle for the mail, and other valuables.

The employment of the casks used for water and provisions on shipboard renders the construction of this raft very economical, and is important from the fact that the vessel need not be crowded by floats made especially for the purpose.

The filling of the water casks to one fourth their capacity of water leaving the remainder to be occupied with air provides a ballast to the central line of the raft, besides furnishing sustenance to the passengers.

The manner of securing the eyes *e* and closing the provision and other casks is of great importance and will be fully understood from the drawing. The rods *r* are by the use of the spring catches, as shown in Fig. 6 of the best possible construction for the purpose.

I do not claim the formation of rafts by the union of water casks or other buoyant articles. Nor do I claim using casks partially filled with water separately considered. But What I do claim is—

The canvas sheet provided with tubes *a* and serving the double purpose of awning and water receiver and connected with the raft substantially as hereinbefore set forth.

In testimony whereof, I have hereunto signed my name before two subscribing witnesses.

LORENZO TAGGART.

Witnesses:
GEO. PATTEN,
JOHN HOLLINGSHEAD.

[FIRST PRINTED 1911.]